United States Patent [19]

Carroll et al.

[11] Patent Number: 5,837,654
[45] Date of Patent: Nov. 17, 1998

[54] HIGH TEMPERATURE ENVIRONMENTALLY BENIGN DRILLING FLUID, AND VISCOSIFYING ADDITIVES FOR USE THEREWITH

[75] Inventors: Paul W. Carroll; David Hugh Durham; Thomas C. Farrow, all of Gonzales, Tex.

[73] Assignee: Southern Clay Products, Inc., Gonzales, Tex.

[21] Appl. No.: 851,677

[22] Filed: May 6, 1997

[51] Int. Cl.[6] ............................................. C09K 7/06
[52] U.S. Cl. ..................... 507/100; 252/315.2; 507/901; 507/904
[58] Field of Search .................. 106/468; 252/313.1, 252/315.2, 315.5, 315.6; 507/901, 904, 100; 508/136

[56] References Cited

U.S. PATENT DOCUMENTS

| | | |
|---|---|---|
| 2,552,775 | 5/1951 | Fisher et al. . |
| 3,027,322 | 3/1962 | Stuchell et al. . |
| 3,509,066 | 4/1970 | Jocobs et al. . |
| 3,687,846 | 8/1972 | Lang . |
| 3,691,070 | 9/1972 | Pippen . |
| 4,033,893 | 7/1977 | Mondshine . |
| 4,087,365 | 5/1978 | Clem . |
| 4,105,578 | 8/1978 | Finlayson et al. . |
| 4,382,868 | 5/1983 | House . |
| 4,462,470 | 7/1984 | Alexander et al. . |
| 4,464,274 | 8/1984 | House ........................................ 252/28 |
| 4,508,628 | 4/1985 | Walker et al. ......................... 252/8.5 P |
| 4,569,923 | 2/1986 | Knudson, Jr. et al. . |
| 4,600,515 | 7/1986 | Gleason et al. . |
| 4,664,842 | 5/1987 | Knudson, Jr. et al. . |
| 4,743,305 | 5/1988 | Diodge et al. . |
| 5,110,501 | 5/1992 | Knudson, Jr. et al. . |
| 5,160,454 | 11/1992 | Knudson, Jr. et al. . |
| 5,616,286 | 4/1997 | Jordan ................................... 252/315.2 |

*Primary Examiner*—Richard D. Lovering
*Attorney, Agent, or Firm*—Klauber & Jackson

[57] ABSTRACT

An oil base environmentally benign drilling fluid composition having a stable high viscosity and high gel strength at use temperatures of up to at least 450° F. The drilling fluid includes a low toxicity biodegradable oil vehicle, and as a viscosifying agent an organoclay which is the reaction product of a mineral clay mixture and an alkyl quaternary ammonium salt. The mineral clay mixture comprises at least 50% by weight of a mineral clay selected from the group consisting of sepiolite, palygorskite and mixtures of sepiolite and palygorskite; and substantially the balance of the mixture is a smectite. Conventional additives such as emulsifiers and fillers may also be present in the drilling fluid.

24 Claims, No Drawings

HIGH TEMPERATURE ENVIRONMENTALLY BENIGN DRILLING FLUID, AND VISCOSIFYING ADDITIVES FOR USE THEREWITH

FIELD OF THE INVENTION

This invention relates generally to fluids used in the drilling of oil, gas, steam and other wells, and more specifically relates to an oil base environmentally benign drilling fluid having a stable high viscosity and a high gel strength when used under high temperature drilling conditions.

BACKGROUND OF THE INVENTION

In the course of drilling an oil, gas or water well by means of rotary drilling tools, the drill pipe and bit are rotated to drill out the borehole. A so-called "drilling fluid" or "drilling mud" is circulated downwardly through the hollow drill stem and bit to the bottom of the borehole and then upwardly through the surface through the annular space between the drill stem and the interior of the borehole. This drilling fluid comprises a suspension of solid material in a liquid medium and may contain other added agents. The drilling fluid lubricates and cools the drill bit, and suspends and carries cuttings out of the borehole. In order to perform these and other functions the drilling fluid should desirably have certain physical characteristics. These include a viscosity that enables it to be pumped and circulated. Also the fluid should have sufficient gel strength that cuttings will remain suspended in the borehole if circulation of the fluid is stopped, as for example by a mechanical failure.

In those instances where the drilling fluid has an oil base, organophilic clays (hereinafter referred to as "organoclays") have long been used as thickeners and/or suspending agents. These organoclays, representing the reaction product of a smectite-type clay with a quaternary ammonium compound, are well-known in the art and are disclosed in numerous U.S. Patents such as U.S. Pat. Nos. 4,105,578, 4,569,923 and 4,664,842. The drilling fluids of the prior art which incorporate these organoclays have provided satisfactory performance under relatively moderate operating temperatures. However where drilling temperatures begin to exceed around 300° F., conventional organoclays other than those based on hectorite begin to perform poorly. Particularly in the higher range extending to 450°–550° F. or higher, these conventional drilling fluids (including those based on hectorite organoclays) have displayed an undesirable loss in viscosity and gel strength.

OBJECTS OF THE INVENTION

Pursuant to the foregoing, it may be regarded as an object of the present invention, to provide an oil base drilling fluid composition having a stable high viscosity and high gel strength, at use temperatures of up to at least 450° F.

It is a further object of the invention, to provide a drilling fluid composition of the foregoing character, which is environmentally friendly, in utilizing a low toxicity oil vehicle which biodegrades in the earth environment in which it is used.

SUMMARY OF THE INVENTION

Now in accordance with the present invention, an oil base environmentally benign drilling fluid composition is provided which has a stable high viscosity and high gel strength at use temperatures of up to at least 450° F. The drilling fluid comprises a low toxicity biodegradable oil vehicle, and as a viscosifying agent, an organoclay which is the reaction product of a mineral clay mixture and an alkyl quaternary ammonium salt. The viscosifying agent is preferably present in concentrations of 4 to 6 lbs/barrel of the drilling fluid. The mineral clay mixture used to prepare the organoclay comprises at least 50% by weight of a mineral clay (a) selected from the group consisting of sepiolite, palygorskite and mixtures of sepiolite and palygorskite; and substantially the balance of the mixture is a mineral clay (b) comprising a smectite. The drilling fluids of the invention are found to have a yield point of at least 50 lbs/100 ft$^2$ of drill pipe area.

DETAILED DESCRIPTION OF THE INVENTION

The oil vehicle utilized in the present invention is one which is environmentally benign, by which is meant that the oil is one that over a reasonable course of time will biodegrade in the ground into relatively harmless products. Oils of this type are well known for use in drilling fluids and similar applications, and are commonly a hydrotreated light distillate. The resultant product contains minimal, if any quantities of aromatic components, and mostly short chain hydrocarbons. The LTV oil of Conoco and the Low Toxicity Drilling Mud Oil of Exxon are commercial examples of such products. Synthesized biodegradable oils based on alpha olefins or the like are also acceptable for the present use.

In addition to containing preferably from about 4 to 6 lbs/barrel of the organoclay viscosifying agent that will be further discussed below, the drilling fluids of the invention may contain conventional additives such as emulsifying agents, and fillers such as barium sulfate. As used herein the term "barrel" refers to that volume which is standard in oil field practice and contains 42 U.S. gallons.

The organoclay compositions which are incorporated in the drilling fluids of the present invention comprise mineral clay mixtures which have been treated with alkyl quaternary ammonium compounds. Such mineral clay mixtures in turn comprise: mineral clay (a) comprising greater than 50 wt. %, based on the weight of the mineral clay mixture, of a mineral clay selected from the group consisting of sepiolite, palygorskite and mixtures of sepiolite and palygorskite; and mineral clay (b) comprising less than 50 wt. %, based on the weight of the mineral clay mixture, of a smectite. Preferably, mineral clay (a) is present in an amount of 60 to 98 wt. %, especially 70 to 90 wt. %, based on the weight of the mineral clay mixture, with mineral clay (b), i.e. the smectite being the balance of the mixture.

Of the two mentioned phyllosilicates, sepiolite is preferred for use in the invention. Both sepiolite and palygorskite are included in the phyllosilicates because they contain a continuous two-dimensional tetrahedral sheet of composition $T_2O_5$(T=Si, Al, Be, . . . ) but they differ from the other layer silicates in lacking continuous octahedral sheets. Further details of the structures of these minerals, including the structural distinctions between the two, may be found in B. F. Jones and E. Galan "Sepiolite and Palygorskite", Chapter 16 of Hydrous Phyllosilicates, *Reviews in Mineralogy,* Volume 19, (Mineralogical Society of America, Washington, D.C., 1988).

Preferably, the smectite is a natural or synthetic clay mineral selected from the group consisting of hectorite, montmorillonite, bentonite, beidelite, saponite, stevensite and mixtures thereof. A particularly preferred choice of the smectite is hectorite.

In a preferable procedure for preparing the organoclay composition, the sepiolite and/or palygorskite is crushed, coarse ground, and slurried in water, milled in a bead mill and passed through a hydroclone to separate +325 mesh material followed by screening, to remove grit and other impurities. The smectite mineral is beneficiated in accordance with usual practice for preparation of organoclays, which includes in addition to the steps just mentioned, a high speed centrifuging step to further refine the material. Each of the component minerals is then subjected as a dilute (1 to 6% solids) aqueous slurry to high shearing in a suitable mill. Most preferred for use in this shearing step is a homogenizing mill of the type wherein high speed fluid shear of the slurry is effected by passing the slurry at high velocities through a narrow gap, across which a high pressure differential is maintained. This type of action can e.g. be effected in the well-known Manton-Gaulin "MG") mill, which device is sometimes referred to as the "Gaukin homogenizer". Reference may be made to commonly assigned U.S. Pat. Nos. 4,664,842 and 5,110,501 for further details of such mill. The conditions for use of the MG mill may in the present instance be substantially as in the said patents; e.g. the said pressure differential across the gap is preferably in the range of from 1,000 to 8,000 psig with 4,000 to 6,000 psig being more typical in representative operations. Depending upon the specifics of the equipment, pressures higher than 8,000 psig can readily be used. The slurry to be treated may be passed one or more times through the MG mill.

Among additional instrumentalities which can be effectively utilized in the present invention to provide high shearing of the clay components, is the rotor and stator arrangement described in commonly assigned U.S. Pat. No. 5,160,454. The use of high shear in the present invention is not only important in providing the benefits for the smectite which are discussed in the foregoing patents; but moreover in the instances of the sepiolite and/or palygorskite, such high shearing acts to "debundle" the otherwise "bundled" type of structures which exist in the latter minerals. It is this debundling action which in part is believed to be instrumental in yielding the results achieved in the present invention.

Following the high shear step, the clay components slurries may be mixed with one another. Alternatively, the two or more clay components can be intermixed in a single slurry before the latter is subjected to the high shear step. Following such step the single slurry is heated to at least 180° F., optionally with hydrocloric acid treatment, and is intermixed with the alkyl quaternary ammonium salt, after which the slurry is dewatered, and the alkyl quaternary ammonium-treated clay dried and ground to provide a dry organoclay product.

The alkyl quaternary ammonium salts employed for treating the mineral clay mixtures comprise alkyl quaternary ammonium salts containing the same or different straight- and/or branched-chain saturated and/or unsaturated alkyl groups of 1 to 22 carbon atoms and the salt moiety is selected from the group consisting of chloride, bromide, methylsulfate, nitrate, hydroxide, acetate, phosphate and mixtures thereof, preferably chloride, bromide and methylsulfate. The preferred choices of the alkyl quaternary ammonium salts are dimethyl di(hydrogenated tallow) ammonium chloride, methylbenzyl di(hydrogenated tallow) ammonium chloride, dimethylbenzyl hydrogenated tallow ammonium chloride, dimethyl hydrogenated tallow-2-ethylhexylammonium methylsulfate and mixtures of two or more of the preferred choices. The mineral clay mixture is typically treated with 5 to 80 milliequivalents (meq.), preferably 5 to 50, and more preferably 10 to 35 meq., of the alkyl quaternary ammonium salt per 100 g of the clay mixture.

The invention will now be illustrated by examples, which are to be regarded as illustrative and not delimitative of the invention. Unless otherwise indicated to the contrary, all parts and percentages are by weight.

EXAMPLE

A series of drilling fluid compositions were prepared utilizing the following procedure:

TABLE I

| Preparation of Drilling Fluid Formulation | |
|---|---|
| LVT-200 Oil[1] | 241.5 ml (196 g) |
| Carbotec Emulsifier[2] | 8.5 g |
| Mix 5 minutes, then add | |
| Lime | 5.0 g |
| Mix 5 minutes, then add | |
| 30% solution $CaCl_3$ | 45.5 g (13.7 ml) |
| Mix 5 minutes, then add | |
| Organoclay | 6.0 g |
| Mix 15 minutes, then add | |
| Barium Sulfate | 236.0 g |
| Mix 10 minutes, then add | |
| Carb-mul Emulsifer[3] | 3.0 ml |
| Mix 5 minutes | |
| Total Volume = | 350.0 ml |

[1]Conco product
[2,3]Surfactant products of Baker Hughes Inteq, Houston, Texas

Properties of the resultant drilling fluids were determined by the established procedures recommended by the American Petroleum Institute API RP 13B, Fourth Edition, November, 1972, including yield point (YP), plastic viscosity (PV), and gel strength ("Gels") (determined for a fresh sheared sample at 3 r.p.m., and then after the slurry has gelled for 10 minutes). This data is set forth in Table II below for four samples of drilling fluids in accordance with the invention (A,B,C,and D) and for a control sample (Control) which was formulated in a manner similar to the test samples except for the use of a conventional organoclay as a viscosity agent. The organoclay used in the control was the Bentone 38 product of Rheox, Inc. which is understood to represent the reaction product of a hectorite with a 100% dimethyl di(hydrogenated tallow) quaternary ammonium salt (referred to in the notes for Table II as "2M2HT"). Details respecting the preparation and compositions of the several samples are set forth following the Table. The first set of the samples in the tabulated data were subjected to evaluation at a temperature of around 150° F.; and the remaining sets to similar evaluation after 16 hours of hot rolling at temperatures of respectively 300°, 350°, 400°, and 450° F.

TABLE II

| Drilling of Fluid at 6 lb., Organoclay per Barrel | | | | | | |
|---|---|---|---|---|---|---|
| Sample | 600/300 Fann Readings | 200/100 | 6/3 | Gel Strength lbs/100 ft | PV cps | YP lbs/100 ft$^2$ |
| A | 40/23 | — | —/2 | — | 17 | 6 |
| B | 36/20 | — | —/1 | — | 16 | 4 |
| C | 38/21 | — | —/1 | — | 17 | 4 |
| D | 35/20 | — | —/1 | — | 15 | 5 |
| Control | 28/15 | — | —/0 | — | 13 | 2 |
| | | | 300° F. | | | |
| A | 67/38 | 27/15 | 2/1 | 4/6 | 29 | 9 |
| B | 74/46 | 35/21 | 4/3 | 6/10 | 28 | 18 |
| C | 71/44 | 33/20 | 3/2 | 4/10 | 27 | 17 |
| D | 60/36 | 26/15 | 2/1 | 5/8 | 24 | 12 |

TABLE II-continued

| | | | | | | |
|---|---|---|---|---|---|---|
| Control | 51/31 | 22/13 | 1/0 | 3/14 | 20 | 11 |
| | | | 350° F. | | | |
| A | 83/50 | 37/22 | 2/1 | 2/8 | 33 | 17 |
| B | 148/102 | 80/54 | 13/10 | 10/24 | 46 | 56 |
| C | 144/99 | 78/52 | 13/10 | 10/26 | 45 | 54 |
| D | 142/100 | 80/54 | 13/10 | 9/23 | 42 | 58 |
| Control | 143/87 | 62/36 | 4/2 | 3/5 | 56 | 31 |
| | | | 400° F. | | | |
| A | 163/102 | 77/48 | 9/7 | 12/24 | 61 | 41 |
| B | 177/123 | 97/66 | 18/14 | 12/22 | 54 | 69 |
| C | 170/118 | 94/64 | 17/13 | 12/23 | 52 | 66 |
| D | 178/124 | 98/67 | 16/12 | 10/19 | 54 | 70 |
| Control | 166/95 | 67/37 | 3/2 | 2/14 | 71 | 24 |
| | | | 450° F. | | | |
| A | 158/96 | 73/45 | 12/10 | 18/32 | 62 | 34 |
| B | 143/92 | 70/45 | 12/10 | 13/25 | 51 | 41 |
| C | 134/86 | 64/40 | 12/11 | 13/23 | 48 | 38 |
| D | 155/104 | 80/54 | 16/14 | 14/29 | 51 | 53 |
| Control | 110/60 | 42/22 | 2/1 | ½ | 50 | 10 |

Notes for Table II

| | LOI | Grind −200M | Packed Bulk Density lb./ft³ | % 2M2HT | % MBDT | Description |
|---|---|---|---|---|---|---|
| Sample A | 22.6 | 74 | 8.9 | 100 | — | Bead milled and hydrocloned, slurry passed through MG at 4500 psig with 100% Sepolite |
| Sample B | 22.6 | 56 | 11.4 | 100 | — | Same as above except 80/20 ratio sepiolite/hectorite |
| Sample C | 22.9 | 70 | 10.1 | 75 | 25 | Same as above except 80/20 ratio sepiolite/hectorite |
| Sample D | 22.8 | 60 | 10.6 | 50 | 50 | Same as above except 80/20 ratio sepiolite/hectorite |

LOI = Loss on Ignition
2M2HT = dimethyldi (hydrogenated tallow) ammonium salt
MBDT = methyl benzyl ditallow ammonium salt It will be seen that the test samples prepared in accordance with the invention, and particularly those in which the mixed mineral clay reacted to prepare the organoclay is based on a mixture of sepiolite with hectorite, yielded far superior results at the higher temperatures of the test procedures than was obtained with the drilling fluid which is based on a conventional viscosity additive.

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. An oil base environmentally benign drilling fluid composition having a stable high viscosity and high gel strength under high temperature drilling use at temperatures of ranging from around 300° F. up to at least 450° F., comprising a low toxicity biodegradable oil vehicle, and as a viscosifying agent, from an organoclay which is the reaction product of a mineral clay mixture and an alkyl quaternary ammonium salt, said mixture comprising:

60 to 98% by weight of a mineral clay (a) selected from the group consisting of sepiolite, palygorskite and mixtures of sepiolite and palygorskite; aid substantially the balance of said mixture being a mineral clay (b) comprising a smectite selected from the group consisting of hectorite, montmorillonite, bentonite, beidelite, saponite, stevensite and mixtures thereof.

2. A drilling composition in accordance with claim 1, wherein said viscosifying agent is present as 4 to 6 lbs/barrel of the fluid.

3. The drilling fluid composition of claim 1 wherein mineral clay (a) is present in an amount of 70 to 90 wt. %, based on the weight of the mineral clay mixture.

4. The drilling fluid composition of claim 1, wherein the smectite comprises hectorite.

5. The drilling fluid composition of claim 1, wherein mineral clay (a) is sepiolite.

6. The drilling fluid composition of claim 5, wherein mineral clay (b) is hectorite.

7. The drilling fluid composition of claim 1 wherein the alkyl quaternary ammonium salt contains the same or different straight- and/or branched-chain saturated and/or unsaturated alkyl groups of 1 to 22 carbon atoms and the salt moiety is selected from the group consisting of chloride, bromide, methylsulfate, nitrate, hydroxide, acetate, phosphate and mixtures thereof.

8. The drilling fluid composition of claim 7, wherein the alkyl quaternary ammonium salt is selected from the group consisting of dimethyl di(hydrogenated tallow) ammonium chloride, methylbenzyl di(hydrogenated tallow) ammonium chloride, dimethylbenzyl hydrogenated tallow ammonium chloride, dimethyl hydrogenated tallow-2-ethylhexylammonium methylsulfate and mixtures thereof.

9. The drilling fluid composition of claim 1 wherein the mineral clay mixture is treated with about 5 to 80 meq. of the alkyl quaternary ammonium salt per 100 g of the mineral clay mixture.

10. The drilling fluid composition of claim 1 wherein the mineral clay mixture is treated with 5 to 50 meq. of the alkyl quaternary ammonium salt per 100 g of the mineral clay mixture.

11. The drilling fluid composition of claim 1 wherein the mineral clay mixture is treated with 10 to 35 meq. of the alkyl quaternary ammonium salt per 100 g of the mineral clay mixture.

12. The drilling fluid composition of claim 1, further including an emulsifying agent and a filler.

13. The drilling composition of claim 1, having a yield point of at least 50 lbs/100 ft² at 350° F.

14. A viscosifying composition for use in oil base drilling fluids, which maintains a stable high viscosity and high gel strength in said drilling fluid in the presence of high temperature drilling conditions at temperatures ranging from around 300° F. to at least 450° F., said viscosifying composition comprising an organoclay which is the reaction product of a mineral clay mixture which has been treated with an alkyl quaternary ammonium compound, said mineral clay mixture comprising:

mineral clay (a) comprising 60 to 98 wt. %, based on the weight of the mineral clay mixture, of a mineral clay selected from the group consisting of sepiolite, palygorskite and mixtures of sepiolite and palygorskite; and mineral clay (b) comprising less than 50 wt. %, based on the weight of the mineral clay mixture, of a smectite selected from the group consisting of hectorite, montmorillonite, bentonite, beidelite, saponite, stevensite and mixtures thereof.

15. The organoclay composition of claim 14, wherein mineral clay (a) is present in an amount of 70 to 90 wt. %, based on the weight of the mineral clay mixture.

16. The organoclay composition of claim 15, wherein the smectite comprises hectorite.

17. The organoclay composition of claim 14, wherein the alkyl quaternary ammonium salt contains the same or different straight- and/or branched-chain saturated and/or unsaturated alkyl groups of 1 to 22 carbon atoms and the salt moiety is selected from the group consisting of chloride, bromide, methylsulfate, nitrate, hydroxide, acetate, phosphate and mixtures thereof.

18. The organoclay composition of claim 17, wherein the alkyl quaternary ammonium salt is selected from the group consisting of dimethyl di(hydrogenated tallow) ammonium chloride, methylbenzyl di(hydrogenated tallow) ammonium chloride, dimethylbenzyl hydrogenated tallow ammonium chloride, dimethyl hydrogenated tallow-2-ethylhexylammonium methylsulfate and mixtures thereof.

19. The organoclay composition of claim 14, wherein the mineral clay mixture is treated with about 5 to 80 meq. of the alkyl quaternary ammonium salt per 100 g of the mineral clay mixture.

20. The organoclay composition of claim 14, wherein the mineral clay mixture is treated with 5 to 50 meq. of the alkyl quaternary ammonium salt per 100 g of the mineral clay mixture.

21. The organoclay composition of claim 14, wherein the mineral clay mixture is treated with 10 to 35 meq. of the alkyl quaternary ammonium salt per 100 g of the mineral clay mixture.

22. A viscosifying composition in accordance with claim 14, wherein said component mineral clays (a) and (b) have been subjected to high shearing as dilute aqueous slurries prior to treatment with said quaternary ammonium compound.

23. A viscosifying composition in accordance with claim 22, wherein said high shearing is effected in a Manton-Gaulin mill.

24. A viscosifying composition in accordance with claim 22, wherein said high shearing is effected in a rotor and stator mill.

* * * * *